United States Patent
Yoshinaga

(10) Patent No.: US 9,389,661 B2
(45) Date of Patent: Jul. 12, 2016

(54) ELECTRONIC DEVICE AND METHOD OF CONTROLLING ELECTRONIC DEVICE

(71) Applicant: PANASONIC CORPORATION, Osaka (JP)

(72) Inventor: Kenji Yoshinaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 322 days.

(21) Appl. No.: 14/224,975

(22) Filed: Mar. 25, 2014

(65) Prior Publication Data

US 2014/0298048 A1    Oct. 2, 2014

(30) Foreign Application Priority Data

Mar. 26, 2013  (JP) ................... 2013-063469
Mar. 7, 2014   (JP) ................... 2014-044582

(51) Int. Cl.
*G06F 1/26*     (2006.01)

(52) U.S. Cl.
CPC ..................... *G06F 1/263* (2013.01)

(58) Field of Classification Search
CPC ..................................................... G06F 1/263
See application file for complete search history.

(56) References Cited

U.S. PATENT DOCUMENTS

2011/0278937 A1*  11/2011  Patino ............... G06F 1/203
                                                   307/80
2014/0189375 A1*  7/2014  Loiler ............... G06F 1/32
                                                   713/300

FOREIGN PATENT DOCUMENTS

EP    2713238 A1 *  4/2014  .......... G06F 1/266
JP    2007-221470 A    8/2007

* cited by examiner

*Primary Examiner* — Kim Huynh
*Assistant Examiner* — Joshua Neveln
(74) *Attorney, Agent, or Firm* — McDermott Will & Emery LLP

(57) ABSTRACT

An electronic device includes a first supply target unit that accepts supply of power from an external power supply, a second supply target unit that accepts supply of power from a battery, a main body, and a controller, wherein the controller starts to accept supply of power from both the external power supply and the battery and starts to output, to the main body, a voltage of the power supplied from both the external power supply and the battery in a case where a predetermined time has elapsed since start of a predetermined operation of the main body while a voltage of power accepted from the external power supply has been output to the main body.

7 Claims, 4 Drawing Sheets

ELECTRONIC DEVICE AND METHOD OF CONTROLLING ELECTRONIC DEVICE

RELATED APPLICATIONS

This application claims the benefit of Japanese Application No. 2013-063469, filed on Mar. 26, 2013, and Japanese Application No. 2014-044582, filed Mar. 7, 2014, the disclosures of which are incorporated by reference herein.

BACKGROUND OF THE INVENTION

1. Field of the Invention

The present disclosure relates to an electronic device and a method of controlling an electronic device.

2. Description of the Related Art

There is known an electronic device capable of being operated by switching of a power supply source between an external power supply and a built-in battery. Moreover, there is known a structure which is operated by preferentially accepting supply of power from the external power supply when the external power supply and the built-in battery are connected to each other in the electronic device (for example, see Unexamined Japanese Patent Publication No. 2007-221470).

SUMMARY OF THE INVENTION

The present disclosure provides an electronic device which has a heat generation amount suppressed and a method of controlling an electronic device to suppress the heat generation amount of the device.

A first electronic device according to the present disclosure includes a first supply target unit that accepts supply of power from an external power supply, a second supply target unit that accepts supply of power from a battery, a main body, and a controller, wherein the controller starts to accept supply of power from both the external power supply and the battery and starts to output, to the main body, a voltage of the power supplied from both the external power supply and the battery in a case where a predetermined time has elapsed since start of a predetermined operation of the main body while a voltage of power accepted from the external power supply has been output to the main body.

Moreover, a second electronic device according to the present disclosure includes a first supply target unit that accepts supply of power from an external power supply, a second supply target unit that accepts supply of power from a battery, a main body, and a controller wherein the controller outputs, to the main body, a voltage of power accepted from the external power supply in a case where a voltage value of the battery is equal to or greater than a predetermined voltage value, and the controller starts to accept supply of power from both the external power supply and the battery and starts to output, to the main body, a voltage of the power supplied from both the external power supply and the battery in a case where the voltage value of the battery is smaller than the predetermined voltage value.

Furthermore, there is provided a method of controlling an electronic device according to the present disclosure, the electronic device including a first supply target unit that accepts supply of power from an external power supply, a second supply target unit that accepts supply of power from a battery, and a main body, and the method includes controlling the electronic device to output, to the main body, a voltage of the power accepted from the external power supply, controlling the electronic device to start to accept supply of power from both the external power supply and the battery in a case where a predetermined time has elapsed since start of a predetermined operation of the main body, and controlling the electronic device to start to output, to the main body, a voltage of the power supplied from both the external power supply and the battery.

According to the present disclosure, it is possible to provide an electronic device which has a heat generation amount suppressed and a method of controlling an electronic device to suppress the heat generation amount of the device.

DETAILED DESCRIPTION OF THE PREFERRED EMBODIMENTS

Exemplary embodiments will be described below in detail with reference to the drawings. However, detailed description more than necessary may be omitted. For example, detailed description of already known matters or repetitive description for the substantially same structure may be omitted. This is to avoid unnecessary redundancy of the following description and to facilitate easy understanding of those skilled in the art.

The inventor(s) provide(s) the accompanying drawings and the following description in order for those skilled in the art to fully understand the present disclosure, and the subject described in the claims should not be thereby construed to be restrictive.

First Exemplary Embodiment

An electronic device according to a first exemplary embodiment will be described below with reference to the drawings. The electronic device according to the present exemplary embodiment can accept supply of power from both power supplies, that is, an external power supply and a built-in battery. The electronic device according to the present exemplary embodiment starts to accept supply of power from both the external power supply and the built-in battery when a predetermined time has elapsed since start of a predetermined operation with the electronic device being operated based on power accepted from the external power supply. Consequently, an amount of heat generated when a power supply voltage converter included in the electronic device converts a power supply voltage of the external power supply into a power supply voltage required for the electronic device is decreased.

Moreover, the electronic device according to the present exemplary embodiment is operated by the power accepted from the external power supply in the case where a voltage value of the built-in battery is equal to or greater than a predetermined voltage value, and the electronic device starts to accept the supply of the power from both the external power supply and the built-in battery in the case where the voltage value of the built-in battery is smaller than the predetermined voltage value. Consequently, the amount of heat generated when the power supply voltage converter included in the electronic device converts the power supply voltage of the external power supply into the power supply voltage required for the electronic device is decreased.

The structure and operation of the electronic device according to the present exemplary embodiment will be described below.

1. Structure

Figure 1:
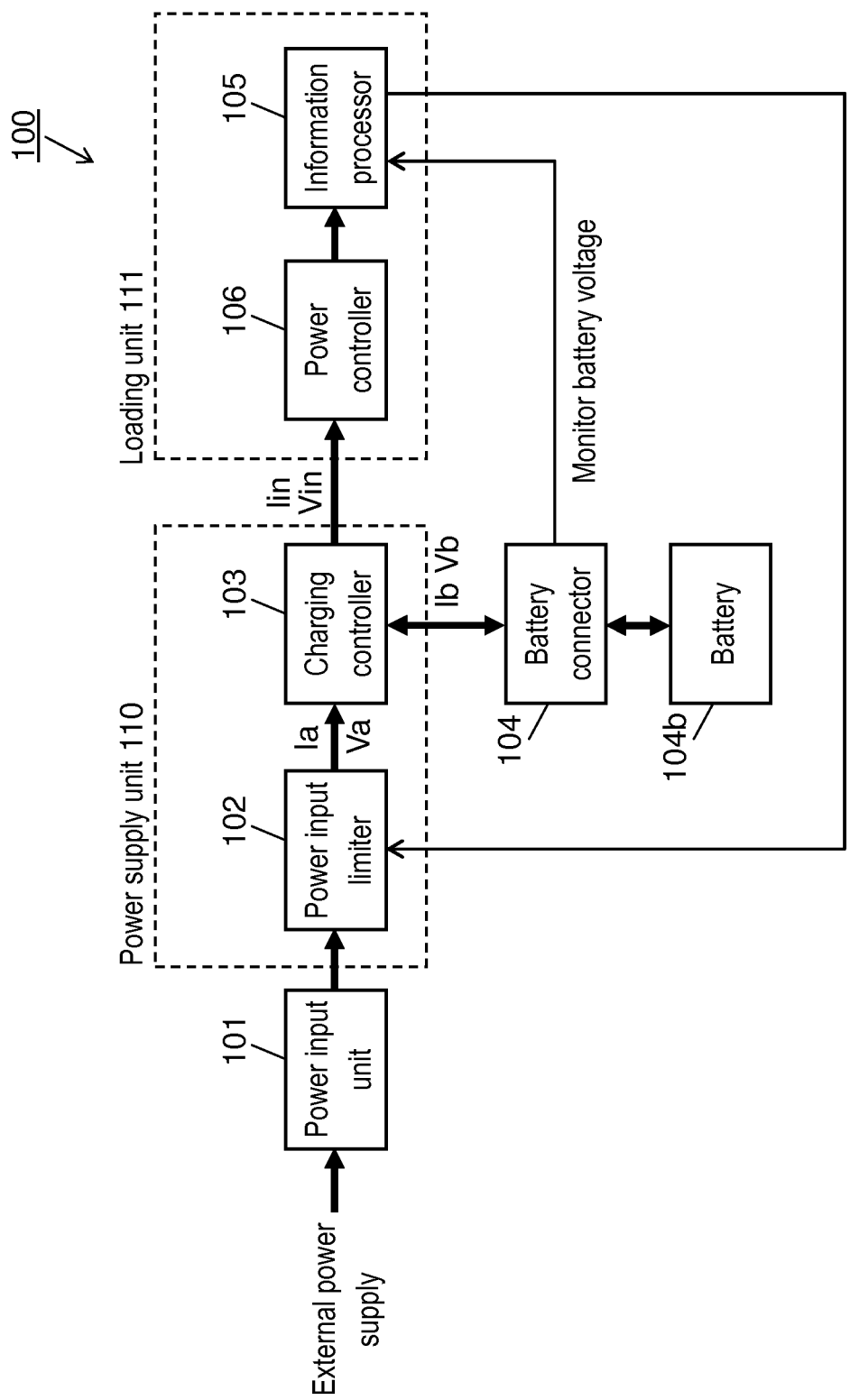
FIG. 1 is a block diagram showing a structure of an electronic device.

The structure of the electronic device will be described below with reference to FIG. 1. FIG. 1 is a block diagram showing a structure of electronic device 100. Electronic device 100 includes power input unit 101, power input limiter 102, charging controller 103, battery connector 104, battery 104b, information processor 105, and power controller 106. Electronic device 100 is a digital still camera or a digital video camera, for example.

Power input unit 101 is a terminal configured to accept supply of power from an external power supply. Power input unit 101 is configured from an exclusive DC jack, a general-purpose DC jack, a Universal Serial Bus (USB) connecting terminal or the like. In short, it is sufficient that power input unit 101 has such a structure as to accept the supply of power from the external power supply. In the case where power input unit 101 is the USB connecting terminal, power input limiter 102 transmits/receives a signal conforming to a USB standard and can thus regulate an amount of current accepted through power input unit 101.

Power input limiter 102 supplies the power accepted from power input unit 101 to charging controller 103. Specifically, power input limiter 102 outputs, to charging controller 103, voltage Va which sets, as an input, the power supplied from power input unit 101. Moreover, power input limiter 102 outputs, to charging controller 103, current Ia inputting the power supplied from power input unit 101. Furthermore, power input limiter 102 can control a magnitude of current Ia. It is assumed that voltage Va to be output to charging controller 103 by power input limiter 102 is basically constant.

Charging controller 103 controls a charging operation to battery 104b. In other words, charging controller 103 supplies the power supplied from power input unit 101 to battery 104b connected to battery connector 104, and thus charges battery 104b.

Moreover, charging controller 103 outputs predetermined voltage Vin to power controller 106 and thus supplies power to loading unit 111. At this time, voltage Vin is controlled by charging controller 103 so as to be always higher than voltage Vb of the battery by $\Delta V$. Next, the reason of the control will be described.

Charging controller 103 has at least two functions including a function for charging battery 104b and a function for supplying power to power controller 106 as described above. Moreover, charging controller 103 is included in a single integrated circuit (IC). When charging battery 104b, a voltage to be output to battery 104b by charging controller 103 is determined in accordance with a magnitude of voltage Vb of battery 104b. Specifically, charging controller 103 outputs, to battery connector 104, a voltage which is always higher than voltage Vb of battery 104b by $\Delta V$. The reason is as follows. When a difference between the magnitude of the voltage of battery 104b and the magnitude of the voltage to be output to battery connector 104 by charging controller 103 is increased, heat generated in battery 104b is increased in a charging operation. Therefore, charging controller 103 outputs, to battery connector 104, a voltage which is always higher than voltage Vb of battery 104b by $\Delta V$ in the charging operation. Thus, according to circumstances in the charging operation, charging controller 103 has a specification for changing a voltage value to be output in accordance with the magnitude of the voltage of battery 104b. As a result, charging controller 103 determines the magnitude of the voltage to be output in accordance with the magnitude of the voltage of battery 104b also in the case where the voltage is output to power controller 106. Current Iin is supplied from charging controller 103 to power controller 106. Moreover, current Ib is supplied from battery 104b.

In addition, charging controller 103 can control switching of a source for supplying power to be supplied to power controller 106 between the external power supply and battery 104b.

Furthermore, charging controller 103 can control to supply current Ib from battery 104b to power controller 106 to complement for a lack in the case where power (current Iin×voltage Vin) required by power controller 106 is higher than power (current Ia×voltage Va) accepted from power input limiter 102. For example, such a situation may occur when electronic device 100 is started to execute processing for recording an image or the like during charging of electronic device 100. Voltage Vb is output to charging controller 103 through battery connector 104 by battery 104b in such a situation.

Thus, charging controller 103 can execute at least control for charging, to battery 104b, power accepted from power input limiter 102 and control for supplying, to power controller 106, the power accepted from power input limiter 102 together with the power accepted from battery 104b. Charging controller 103 is a charging control IC, for example. Charging controller 103 constitutes power supply unit 110 configured to control the supply of power to power controller 106 together with power input limiter 102. Power supply unit 110 may be wholly configured as a single charging control IC.

Information processor 105 has a structure including a CPU or the like, for example. Information processor 105 performs various processing for implementing a main function of the electronic device by execution of a predetermined program through the CPU. Information processor 105 may be configured to implement the function by only a hardware circuit. Information processor 105 can monitor voltage Vb of battery 104b connected to battery connector 104. Moreover, information processor 105 has a function for controlling power input limiter 102 to regulate current Ia to be output from power input limiter 102 to charging controller 103 depending on a processing content and a processing state. Furthermore, information processor 105 has a function for measuring a time elapsed since the start of a predetermined operation.

Power controller 106 is a power control IC, for example. Power controller 106 distributes a voltage output from charging controller 103 to each member such as image processor 105. Specifically, power controller 106 converts the magnitude of the voltage output from charging controller 103 into a magnitude of the voltage required by each member, and outputs the voltage having the magnitude required for each member. Power controller 106 and information processor 105 constitute loading unit 111. Loading unit 111 can be set as a main body of electronic device 100.

Power input unit 101 is an example of a first supply target unit. Battery connector 104 is an example of a second supply target unit. Loading unit 111 is an example of the main body. The structure formed by information processor 105 and charging controller 103 is an example of a controller.

2. Operation

Figure 2:
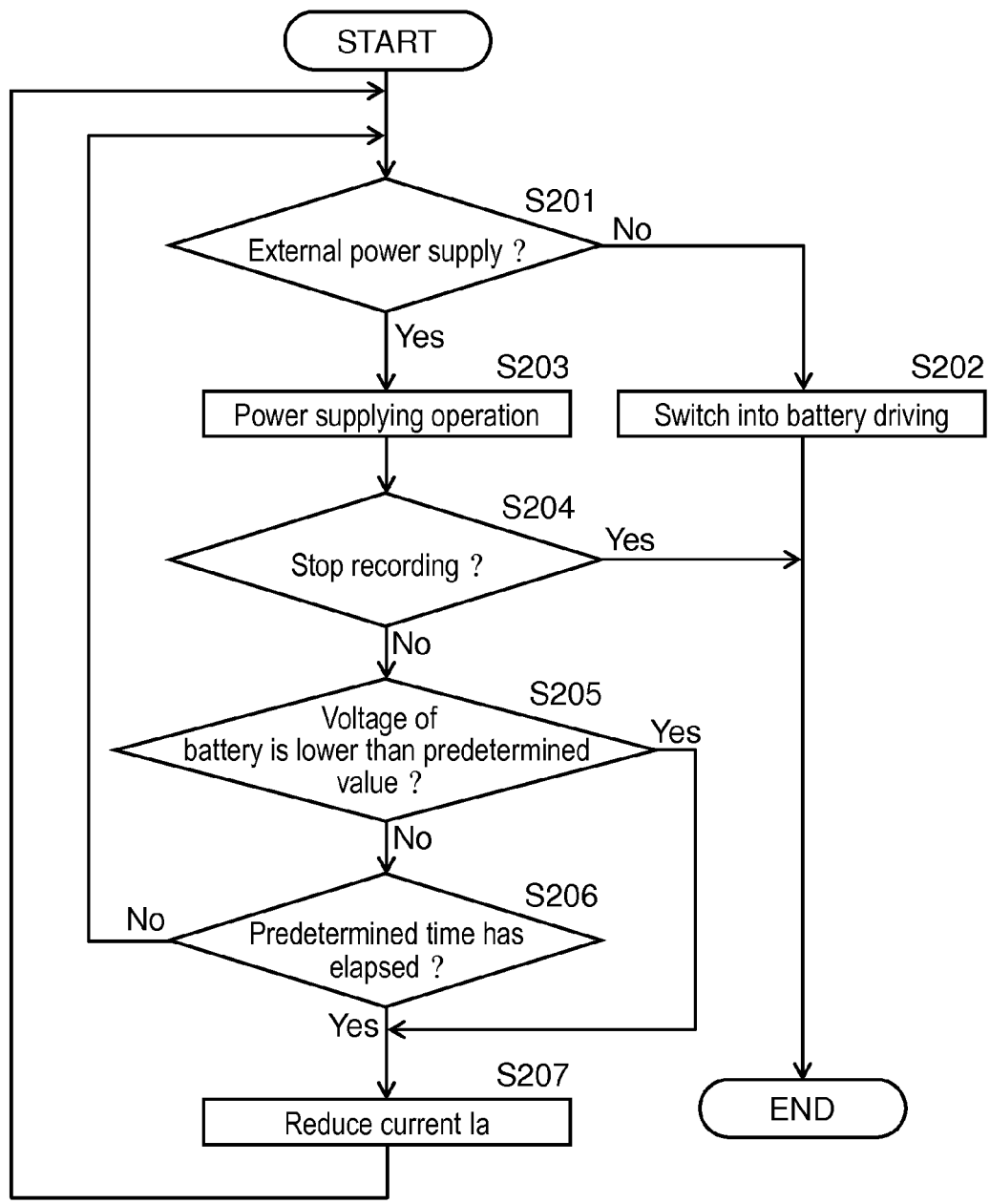
FIG. 2 is a flowchart showing an operation of the electronic device.

Next, an operation of electronic device 100 will be described with reference to FIG. 2. FIG. 2 is a flowchart showing a flow of control in the case where electronic device 100 performs a predetermined operation with an external power supply being connected. A moving image recording operation or the like is considered for the predetermined operation in the case where electronic device 100 is a digital camera. In the following, description will be given of an example in which the predetermined operation is the moving image recording operation. In this case, the moving image recording operation is an operation to encode image data and record the encoded image data in a recording medium.

When electronic device 100 starts the predetermined operation with the external power supply being connected to power input unit 101, information processor 105 determines whether or not the external power supply is connected to power input unit 101 (S201). If information processor 105 detects that the external power supply is disconnected ("NO" in S201), charging controller 103 performs switching into battery driving for operating loading unit 111 by power accepted from battery 104b (S202). Then, the present processing is ended. After step S202, the moving image recording may be continuously carried out by the battery driving or the moving image recording may be ended.

On the other hand, if the external power supply is continuously connected ("YES" in S201), information processor 105 controls power input limiter 102 to supply the power accepted from the external power supply to loading unit 111 through charging controller 103 (S203). At this time, charging controller 103 may execute charging to battery 104b connected to battery connector 104 in parallel or may not execute the charging.

When power input limiter 102 is controlled to supply power to loading unit 111, information processor 105 determines whether or not the moving image recording operation is to be stopped (S204). For example, if an instruction for stopping the moving image recording is accepted from a user or a capacity of the recording medium runs out, information processor 105 determines that the moving image recording operation is to be stopped.

If information processor 105 determines that the moving image recording operation is to be stopped ("YES" in S204), the present processing is ended. On the other hand, if information processor 105 determines that the moving image recording operation is not stopped ("NO" in S204), information processor 105 obtains information about voltage Vb of battery 104b and determines whether or not voltage Vb is lower than predetermined voltage vth (S205). Predetermined voltage vth is preset. Information about voltage vth is stored in a memory (not shown) included in loading unit 111.

If it is determined that voltage Vb is lower than predetermined voltage vth ("YES" in S205), information processor 105 controls power input limiter 102 to vary the magnitude of current Ia to be input from power input limiter 102 to charging controller 103 (S207). Specifically, information processor 105 controls power input limiter 102 to vary current Ia from ia1 to ia2 (where ia1>ia2). Charging controller 103 starts to accept supply of power also from battery 104b to complement a lack when the lack occurs in the power to be supplied to power controller 106 by a variation in current Ia accepted from power input limiter 102. In other words, in the case where the voltage value of battery 104b is smaller than the predetermined voltage value, charging controller 103 starts to accept supply of power from both the external power supply and battery 104b and starts to output, to loading unit 111, a voltage of power supplied from both the external power supply and battery 104b. Herein, a plurality of predetermined voltages vth may be set. In this case, setting may be made in such a manner that current Ia is sequentially decreased every time the magnitude of voltage Vb of battery 104b is smaller than each voltage value. After processing of step S207 is carried out, information processor 105 returns to the processing of step S201 and repeatedly executes the processing.

If voltage Vb is equal to or higher than preset reference voltage vth in strep S205 ("NO in S205), information processor 105 determines whether or not predetermined time t1 has elapsed since the start of the moving image recording (S206).

If it is determined that predetermined time t1 has elapsed ("YES in S206), information processor 105 controls power input limiter 102 to vary the magnitude of current Ia (S207). The processing in step S207 is the same as the processing in the case where it is determined that the magnitude of the voltage of battery 104b is smaller than predetermined voltage vth in step S205. In other words, charging controller 103 starts to accept the supply of power from both the external power supply and battery 104b and starts to output, to loading unit 111, the voltage of the power supplied from both external power supply and battery 104b in the case where a predetermined time has elapsed since the start of a predetermined operation of loading unit 111 while the voltage of the power accepted from the external power supply being output to loading unit 111. Herein, a plurality of predetermined times t1 may be set. In this case, it is also possible to provide such setting as to sequentially decrease current Ia every time each time has elapsed. After the processing of step S207 is carried out, information processor 105 returns to step S201 and repeatedly executes the processing.

On the other hand, if it is determined that voltage Vb is not lower than predetermined voltage vth in step S205 ("NO" in step S205), and it is determined that predetermined time t1 has not elapsed since the start of the moving image recording in step S206 ("No" in step S206), information processor 105 returns to step S201 and repeatedly executes the processing. In other words, charging controller 103 outputs, to loading unit 111, the voltage of the power accepted from the external power supply in the case where the voltage value of battery 104b is equal to or greater than the predetermined voltage value and the predetermined time has not elapsed since the start of the moving image recording.

The technique of the present disclosure does not always require both step S205 and step S206. It is also possible to employ a structure including either step S205 or step S206. For example, if only step S205 is included, it is also possible to employ a structure in which processing of step S207 is executed in the case where voltage Vb of battery 104b is lower than predetermined voltage vth, and the processing is executed by return to step S201 in the case where voltage Vb of battery 104b is equal to or higher than predetermined voltage vth. Moreover, if only step S206 is included, it is also possible to employ a structure in which the processing of step S205 is not executed, the processing of step S207 is executed in the case where predetermined time t1 has elapsed since the start of the predetermined operation of loading unit 111, and the processing is executed by return to step S201 in the case where a predetermined time has not elapsed since the start of the predetermined operation of loading unit 111.

3. Specific Example of Operation 3-1. Specific Example 1

With reference to FIGS. 3A to 3E, description will be given of a specific example of an operation in the case where voltage Vb is equal to or higher than predetermined voltage vth when moving image recording is started. FIGS. 3A to 3E are charts showing a variation in each value depending on an elapsed time since the start of a predetermined operation in the case where voltage Vb is equal to or higher than predetermined value vth.

Figure 3A:
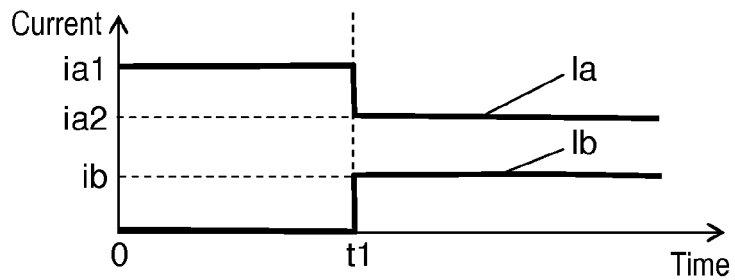
FIG. 3A is a chart showing a variation in current Ia and current Ib depending on an elapsed time since start of a predetermined operation in the case where voltage Vb is equal to or higher than predetermined value vth.

FIG. 3A is a chart showing a variation in current Ia and current Ib depending on an elapsed time since the start of the predetermined operation in the case where voltage Vb is equal to or higher than predetermined value vth. More specifically, FIG. 3A shows how current Ia to be output from power input limiter 102 and current Ib to be output from battery 104b are varied depending on the elapsed time since the start of the moving image recording. Current Ia output from power input limiter 102 is ia1 and is not varied until time t1. Accordingly, Ia is constant. After time t1, current Ia output from power input limiter 102 is changed into ia2. Depending on the change of current Ia to ia2, a shortage amount of current is supplied from battery 104b. Accordingly, current Ib is increased from zero to ib.

Figure 3B:
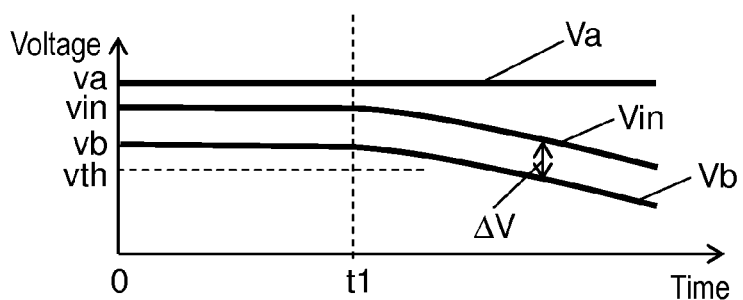
FIG. 3B is a chart showing a variation in voltage Va, voltage Vin, and voltage Vb depending on the elapsed time since the start of the predetermined operation in the case where voltage Vb is equal to or higher than predetermined value vth.

FIG. 3B is a chart showing a variation in voltage Va, voltage Vin, and voltage Vb depending on the elapsed time since the start of the predetermined operation in the case where voltage Vb is equal to or higher than predetermined value vth. More specifically, FIG. 3B shows how voltage Va to be output from power input limiter 102, voltage Vb to be output from battery 104b, and voltage Vin to be output from charging controller 103 are varied depending on the elapsed time since the start of the moving image recording. When discharge from battery 104b is started after time t1, voltage Vb is reduced with elapse of time. Charging controller 103 controls voltage Vin depending on the reduction in voltage Vb. In the present exemplary embodiment, charging controller 103 controls voltage Vin to be higher than voltage Vb by ΔV which has a constant value. For this reason, voltage Vin is gradually reduced together with voltage Vb.

Figure 3C:
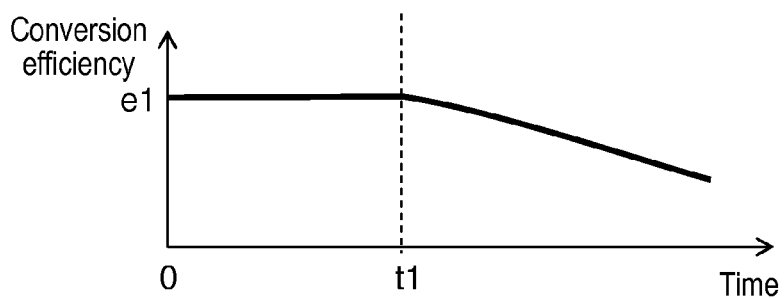
FIG. 3C is a chart showing a variation in conversion efficiency of a voltage depending on the elapsed time since the start of the predetermined operation in the case where voltage Vb is equal to or higher than predetermined value vth.

FIG. 3C is a chart showing a variation in conversion efficiency of a voltage depending on the elapsed time since the start of the predetermined operation in the case where voltage Vb is equal to or higher than predetermined value vth. More specifically, FIG. 3C shows how the conversion efficiency of the voltage in charging controller 103 is varied depending on the elapsed time since the start of the moving image recording. Immediately after the start of the moving image recording, a difference between voltage Va and voltage Vin is not changed. Accordingly, the conversion efficiency is e1 which is constant. After time t1, voltage Vin is also reduced with a drop in voltage Vb. Consequently, the difference between voltage Va and voltage Vin is increased. As a result, the conversion efficiency of the voltage in charging controller 103 is reduced. Power (current Ia×voltage Va) accepted from power input limiter 102 is partially lost because the conversion efficiency in charging controller 103 is smaller than one. As a result, heat is generated in charging controller 103.

Figure 3D:
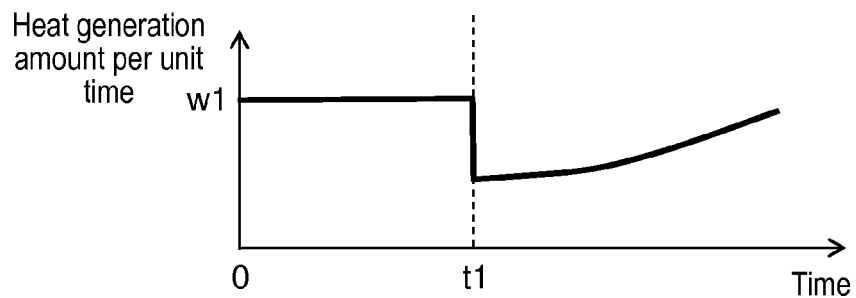
FIG. 3D is a chart showing a variation in a heat generation amount per unit time of power supply unit 110 depending on the elapsed time since the start of the predetermined operation in the case where voltage Vb is equal to or higher than predetermined value vth.

FIG. 3D is a chart showing a variation in a heat generation amount per unit time of charging controller 103 depending on the elapsed time since the start of the predetermined operation in the case where voltage Vb is equal to or higher than predetermined value vth. More specifically, FIG. 3D shows how the heat generation amount in charging controller 103 is varied depending on the elapsed time since the start of the moving image recording. Voltage Vb is not reduced until time t1. Accordingly, the conversion efficiency is e1 which is constant. As a result, the heat generation amount per unit time in charging controller 103 is constant and makes a transition. Moreover, current Ia is reduced at time t1 so that the heat generation amount per unit time in charging controller 103 is reduced. Then, the conversion efficiency of the voltage in charging controller 103 is reduced gradually. Consequently, the heat generation amount per unit time is increased more slowly than that on time t1.

Figure 3E:
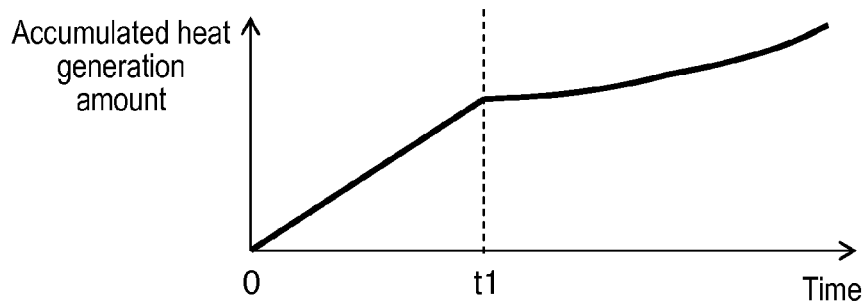
FIG. 3E is a chart showing a variation in an accumulated heat generation amount of power supply unit 110 depending on the elapsed time since the start of the predetermined operation in the case where voltage Vb is equal to or higher than predetermined value vth.

FIG. 3E is a chart showing a variation in an accumulated heat generation amount of charging controller 103 depending on the elapsed time since the start of the predetermined operation in the case where voltage Vb is equal to or higher than predetermined value vth. More specifically, FIG. 3E shows how the accumulated heat generation amount in charging controller 103 is varied depending on the elapsed time since the start of the moving image recording. Until time t1, the accumulated heat generation amount in charging controller 103 is increased with a certain gradient depending on the elapse of time. After time t1, the heat generation amount in charging controller 103 is reduced. Therefore, the accumulated heat generation amount in charging controller 103 is increased with a smaller gradient than that before time t1.

3-2. Specific Example 21

With reference to FIGS. 4A to 4E, next, description will be given of a specific example of an operation in the case where voltage Vb is lower than predetermined voltage vth when moving image recording is started. FIGS. 4A to 4E are charts showing a variation in each value depending on an elapsed time since the start of a predetermined operation in the case where voltage Vb is lower than predetermined value vth.

Figure 4A:
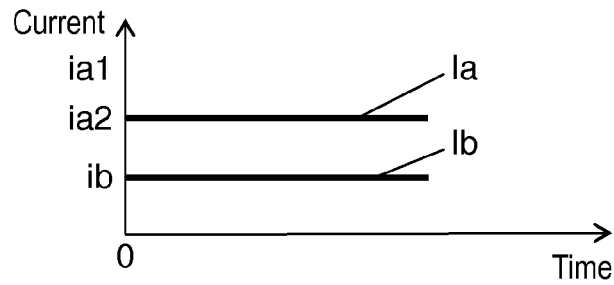
FIG. 4A is a chart showing a variation in current Ia and current Ib depending on an elapsed time since start of a predetermined operation in the case where voltage Vb is lower than predetermined value vth.

FIG. 4A is a chart showing a variation in current Ia and current Ib depending on the elapsed time since the start of the predetermined operation in the case where voltage Vb is lower than predetermined value vth. As shown in FIG. 4A, in the case where voltage Vb is lower than predetermined voltage vth, information processor 105 controls power input limiter 102 to decrease current Ia from ia1 to ia2 immediately after the start of the moving image recording. For this reason, the magnitude of current Ia to be supplied from power input limiter 102 is ia2. Moreover, a shortage amount of power is supplied from battery 104b. Therefore, the magnitude of current Ib reaches ib.

Figure 4B:
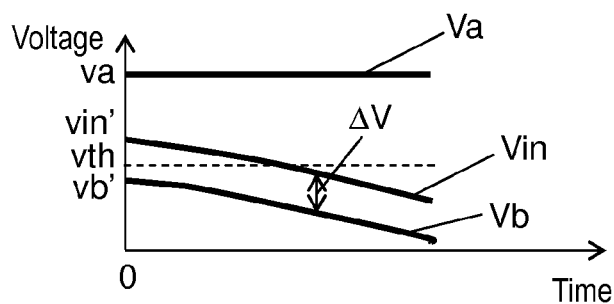
FIG. 4B is a chart showing a variation in voltage Va, voltage Vin, and voltage Vb depending on the elapsed time since the start of the predetermined operation in the case where voltage Vb is lower than predetermined value vth.

FIG. 4B is a chart showing a variation in voltage Va, voltage Vin, and voltage Vb depending on the elapsed time since the start of the predetermined operation in the case where voltage Vb is lower than predetermined value vth. In the case where voltage Vb is lower than predetermined voltage vth, discharge of battery 104b is started immediately after the start of the moving image recording. Accordingly, as shown in FIG. 4B, voltage Vb is reduced depending on elapse of time. Charging controller 103 controls the magnitude of voltage Vin depending on the reduction in voltage Vb. In the present exemplary embodiment, charging controller 103 controls voltage Vin to be higher than voltage Vb by a constant value ΔV. For this reason, voltage Vin is gradually reduced together with voltage Vb.

Figure 4C:
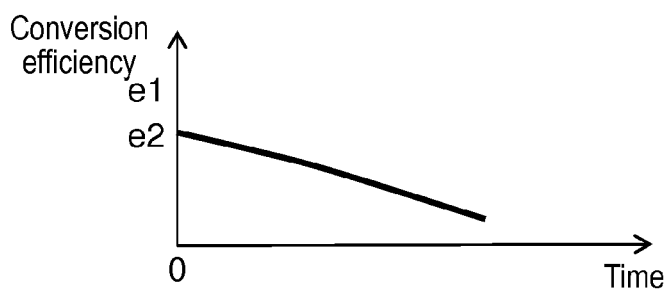
FIG. 4C is a chart showing a variation in conversion efficiency of a voltage depending on the elapsed time since the start of the predetermined operation in the case where voltage Vb is lower than predetermined value vth.

FIG. 4C is a chart showing a variation in conversion efficiency of a voltage depending on the elapsed time since the start of the predetermined operation in the case where voltage Vb is lower than predetermined value vth. In the case where voltage Vb is lower than predetermined voltage vth, the magnitude of Vin is smaller than that in the case where voltage Vb is equal to or higher than predetermined voltage vth immediately after the start of the moving image recording. In other words, the conversion efficiency is also e2 which is smaller than e1 in the case shown in FIG. 3C. Moreover, the magnitude of Vin is reduced immediately after the start of the moving image recording. Therefore, the conversion efficiency is also gradually reduced from e2.

Figure 4D:
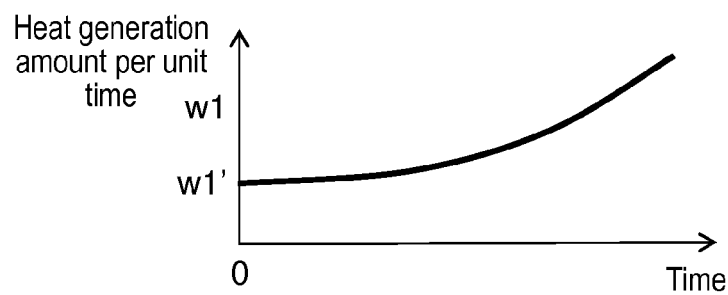
FIG. 4D is a chart showing a variation in a heat generation amount per unit time of power supply unit 110 depending on the elapsed time since the start of the predetermined operation in the case where voltage Vb is lower than predetermined value vth.

FIG. 4D is a chart showing a variation in a heat generation amount per unit time of charging controller 103 depending on the elapsed time since the start of the predetermined operation in the case where voltage Vb is lower than predetermined value vth. The magnitude of current Ia is controlled to be ia2 which is smaller than ia1 immediately after the start of the predetermined operation. Accordingly, as shown in FIG. 4D, the heat generation amount per unit time is smaller than that in the case where current Ia is not decreased.

Figure 4E:
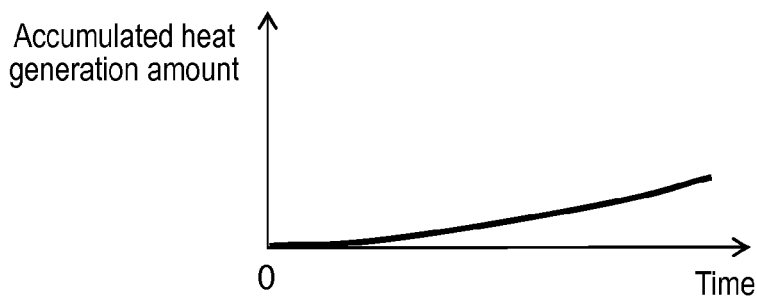
FIG. 4E is a chart showing a variation in an accumulated heat generation amount of power supply unit 110 depending on the elapsed time since the start of the predetermined operation in the case where voltage Vb is lower than predetermined value vth.

FIG. 4E is a chart showing a variation in an accumulated heat generation amount of charging controller 103 depending on the elapsed time since the start of the predetermined operation in the case where voltage Vb is lower than predetermined value vth. As shown in FIG. 4E, increase in the accumulated heat generation amount is gentler than that in the case where current Ia is set to be ia1.

4. Effects and the Like

As described above, electronic device 100 according to the present exemplary embodiment has the structure including power input unit 101, battery connector 104, loading unit 111, information processor 105, and charging controller 103. Power input unit 101 accepts supply of power from the external power supply. Battery connector 104 accepts supply of power from battery 104b. The structure including information processor 105 and charging controller 103 starts to accept the supply of power from both the external power supply and battery 104b and starts to output, to loading unit 111, the voltage of the power supplied from both the external power supply and battery 104b in the case where the predetermined time has elapsed since the start of the predetermined operation of loading unit 111 with the voltage of the power accepted from the external power supply has been output to loading unit 111.

Consequently, it is possible to suppress the heat generation amount of electronic device 100.

Moreover, electronic device 100 according to the present exemplary embodiment has the structure including power input unit 101, battery connector 104, loading unit 111, information processor 105, and charging controller 103. Power input unit 101 accepts supply of power from the external power supply. Battery connector 104 accepts supply of power from battery 104b. The structure including information processor 105 and charging controller 103 outputs, to loading unit 111, the voltage of the power accepted from the external power supply in the case where a voltage value of battery 104b is equal to or greater than a predetermined voltage value, and the structure starts to accept supply of power from both the external power supply and battery 104b and starts to output, to loading unit 111, a voltage of the power supplied from both the external power supply and battery 104b in the case where the voltage value of battery 104b is smaller than the predetermined voltage value.

Consequently, it is possible to suppress the heat generation amount of electronic device 100.

5. Other Exemplary Embodiments

As described above, the first exemplary embodiment has been described to illustrate the technique disclosed in the present application. However, the technique in the present disclosure is not limited thereto and can also be applied to an exemplary embodiment in which change, replacement, addition, omission, and the like are properly performed. Therefore, other exemplary embodiments will be described below.

In the exemplary embodiments, in the case where the predetermined time has elapsed since the start of the predetermined operation or in the case where voltage Vb is lower than predetermined voltage vth, current Ia is reduced by the predetermined amount. In other words, in the exemplary embodiments, the description has been given of the example in which current Ia is reduced stepwise. However, the present disclosure is not always limited to such an example. For example, it is also possible to employ a structure in which current Ia is gradually reduced after a predetermined condition is satisfied.

Although the description has been given on the assumption that power input limiter 102 and charging controller 103 have the functions and structures in the exemplary embodiments, the present disclosure is not always limited to such structures. For example, it is also possible to employ a structure in which a part of the functions and structures possessed by one of the controllers are included in the other controller.

Although the description has been given on the assumption that each of charging controller 103 and information processor 105 has the function and the structure in the exemplary embodiments, the present disclosure is not always limited to such a structure. For example, it is also possible to employ a structure in which a part of the functions and structures possessed by one of the controllers are included in the other controller.

The concept of the power control described in the exemplary embodiments can be applied to various electronic devices. For example, the concept can be applied to an imaging device having a function for capturing an image such as a digital camera, a movie camera, and a smart phone.

As described above, the exemplary embodiments have been described to illustrate the technique in the present disclosure. For this purpose, the accompanying drawings and the detailed description have been provided.

Accordingly, the components described in the accompanying drawings and the detailed description may include not only components indispensable for solving the problems, but also components which are not indispensable for solving the problems. Even if the components which are not indispensable are described in the accompanying drawings or the detailed explanation, the components which are not indispensable should not be immediately recognized to be indispensable.

Moreover, the exemplary embodiments are used for illustrating the technique in the present disclosure. Therefore, change, replacement, addition, omission, and the like can be variously made in the claims or equivalent ranges thereof.

What is claimed is:

1. An electronic device comprising:
    a first supply target unit that accepts supply of power from an external power supply;
    a second supply target unit that accepts supply of power from a battery;
    a main body; and
    a controller, wherein
    the controller starts to accept supply of power from both the external power supply and the battery and starts to output, to the main body, a voltage of the power supplied from both the external power supply and the battery in a case where a predetermined time has elapsed since start of a predetermined operation of the main body while a voltage of power accepted from the external power supply being output to the main body.

2. The electronic device according to claim 1, wherein the first supply target unit accepts supply of power from the external power supply in conformity to a Universal Serial Bus (USB) standard.

3. The electronic device according to claim 1, wherein the predetermined operation is a recording operation that encodes image data and records the encoded image data in a recording medium, and
    the main body includes an image processor that executes the recording operation.

4. An electronic device comprising:
    a first supply target unit that accepts supply of power from an external power supply;
    a second supply target unit that accepts supply of power from a battery;
    a main body; and
    a controller, wherein
    the controller outputs, to the main body, a voltage of power accepted from the external power supply in a case where a voltage value of the battery is equal to or greater than a predetermined voltage value, and the controller starts to accept supply of power from both the external power supply and the battery and starts to output, to the main body, a voltage of the power supplied from both the external power supply and the battery in a case where the voltage value of the battery is smaller than the predetermined voltage value.

5. The electronic device according to claim 4, wherein the first supply target unit accepts supply of power from the external power supply in conformity to a Universal Serial Bus (USB) standard.

6. The electronic device according to claim 4, wherein the predetermined operation is a recording operation that encodes image data and records the encoded image data in a recording medium, and
    the main body includes an image processor that executes the recording operation.

7. A method of controlling an electronic device including a first supply target unit that accepts supply of power from an external power supply, a second supply target unit that accepts supply of power from a battery, and a main body, the method comprising:
    controlling the electronic device to output, to the main body, a voltage of the power accepted from the external power supply;
    controlling the electronic device to start to accept supply of power from both the external power supply and the battery in a case where a predetermined time has elapsed since start of a predetermined operation of the main body; and
    controlling the electronic device to start to output, to the main body, a voltage of the power supplied from both the external power supply and the battery.

\* \* \* \* \*